United States Patent [19]

Hatakeyama

[11] Patent Number: 5,542,100

[45] Date of Patent: Jul. 30, 1996

[54] MOBILE COMMUNICATION SYSTEM

[75] Inventor: Izumi Hatakeyama, Tokyo, Japan

[73] Assignee: Sony Corporation, Tokyo, Japan

[21] Appl. No.: 402,164

[22] Filed: Mar. 9, 1995

Related U.S. Application Data

[63] Continuation of Ser. No. 242,656, May 13, 1994, abandoned, which is a continuation of Ser. No. 891,323, May 29, 1992, abandoned.

[30] Foreign Application Priority Data

Jun. 6, 1991 [JP] Japan .................................. 3-162038

[51] Int. Cl.$^6$ ................................................ H04B 7/26
[52] U.S. Cl. ..................... 455/56.1; 455/33.1; 455/67.1; 379/59
[58] Field of Search .................................. 340/988, 989, 340/990, 993, 995, 991; 455/33.1, 33.2, 33.4, 53.1, 54.1, 54.2, 56.1, 67.1; 379/59, 60; 364/449, 460, 561; 342/457, 450, 357, 451, 452, 454, 453, 458, 463, 46, 126

[56] References Cited

U.S. PATENT DOCUMENTS

| | | | |
|---|---|---|---|
| 3,276,015 | 9/1966 | Lerwill et al. | 342/453 |
| 3,518,674 | 6/1970 | Moorehead et al. | 455/54.1 |
| 3,573,819 | 4/1971 | Mason | 342/126 |
| 3,646,580 | 2/1972 | Fuller et al. | 342/454 |
| 3,995,273 | 11/1976 | Ulstad | 342/463 |
| 4,278,975 | 7/1981 | Kimura et al. | 342/46 |
| 4,698,781 | 10/1987 | Cockerell, Jr. | 342/451 |
| 4,724,538 | 2/1988 | Farrell | 455/33.1 |
| 4,891,650 | 1/1990 | Sheffer | 342/457 |
| 4,926,496 | 5/1990 | Cole et al. | 455/54.1 |
| 5,023,900 | 6/1991 | Tayloe et al. | 379/59 |
| 5,058,200 | 10/1991 | Huang et al. | 455/33.1 |
| 5,208,756 | 5/1993 | Song | 340/991 |

FOREIGN PATENT DOCUMENTS

| | | | |
|---|---|---|---|
| 0090736 | 3/1990 | Japan | 455/33.1 |
| 0006929 | 1/1991 | Japan | 455/33.1 |

OTHER PUBLICATIONS

*Rescuing 911*, Reed Abelson, Forbes, Mar. 2, 1992, p. 103, USA.

*Ottawa Offers Pocket Alarm to Women for Calling Police*, Japan Times, Feb. 27, 1992, Japan.

*Primary Examiner*—Reinhard J. Eisenzopf
*Assistant Examiner*—Nguyen Vo
*Attorney, Agent, or Firm*—Lise A. Rode, Esq.; Robert P. Biddle, Esq.; Jerry A. Miller

[57] ABSTRACT

A cellular communication system includes a mobile station with a switch or button which, when actuated by the user, calls a predetermined party. In the case of an emergency, the user actuates this switch and automatically places a call to an emergency agency. The switch also actuates a system for automatically locating the mobile station by measuring distances from the mobile station to a plurality of fixed stations in the cellular communication system.

8 Claims, 7 Drawing Sheets

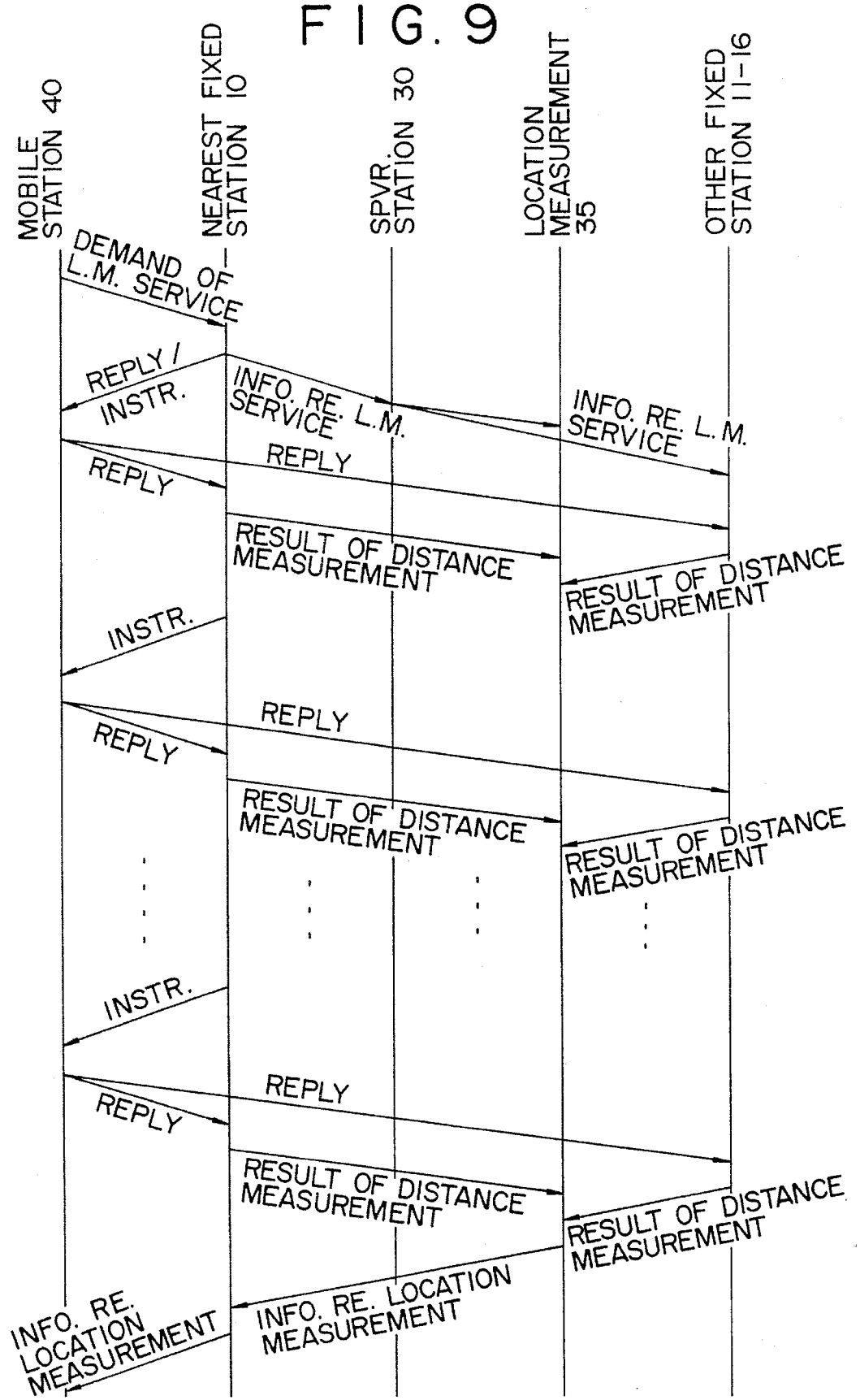

MOBILE COMMUNICATION SYSTEM

This is a continuation of application Ser. No. 08/242,656 filed on May 13, 1994, now abandoned, which is a continuation of Ser. No. 07/891,323 filed on May 29, 1992, which is hereby incorporated by reference, now abandoned.

BACKGROUND

1. Field of the Invention

The present invention relates generally to a mobile communication system such as a telephone system used in an automobile. More particularly, the present invention relates to mobile communication system in which the present location of a caller can be easily determined when the caller hits a single button of a mobile telephone apparatus.

2. Background of the Invention

In Japan, a public pay phone has a single button for use in an emergency. By hitting this button, the telephone automatically starts calling and a telephone line is connected to an emergency agent such as a police or fire station. This service is similar to 911 service in the United States. However, in mobile communication systems using automobile telephones, it is impossible to make an emergency call by hitting a single button. In such systems a caller must dial as a normal phone call to connect the telephone line, and then tell the called party his present location.

As explained above, when calling in an emergency through a mobile communication system, it is impossible to make a simplified call even though it is necessary to quickly obtain assistance. If a caller could complete dialing but the emergency agent does not answer, he would not be able to talk to the called party. Further, if a calling party does not know where he is, a telephone call may not be helpful. Furthermore, when a caller is in a real emergency under circumstances that he cannot speak, it is impossible to inform the called party of the emergency.

SUMMARY OF THE INVENTION

It is, therefore, an object of the present invention to provide a mobile communication system in which the current location of a caller can be easily known by hitting a single button.

It is another object of the present invention to provide mobile communication system in which a caller does not need to talk to the called party to communicate his present location, and therefore, he can inform the called party of the emergency under circumstances that he cannot speak.

In one aspect of the present invention, a mobile communication system includes a mobile station, a plurality of fixed stations and a supervisory station for the fixed station. The mobile station has a switch to be operated and a transmitting circuit for sending a demand signal upon depressing the button. Each of the fixed stations has a circuit for measuring the distance between the mobile station sending the demand signal and another circuit for informing the supervisory station of the result of measurement. A circuit in the supervisory station can seek the location of the mobile station sending the demand signal in accordance with the results of measurements received from a plurality of fixed stations. Then, the supervisory station provides the information regarding the present location of mobile station to an appropriate party.

In accordance with the present invention, the present location of a caller through mobile station can be automatically provided to an emergency agency in order to retrieve assistance. Also, it is possible to inform the agency of the emergency condition even if no one is available to answer the phone call.

Since the supervisory station can recognize the present location of a caller, this invention is also applicable to a simple navigational apparatus for the cellular phone system used with, for example, an automobile telephone. Also, hand-off operations in the cellular phone system (when the automobile goes across the boundary of cell) can be simplified because the neighbor cell and its fixed station can be easily recognized.

BRIEF DESCRIPTION OF THE DRAWING

The invention will be more readily understood with reference to the accompanying drawing, wherein:

FIG. 9 is a chart showing sequential operations of the system shown in FIG. 8.

DESCRIPTION OF THE INVENTION

Figure 1:
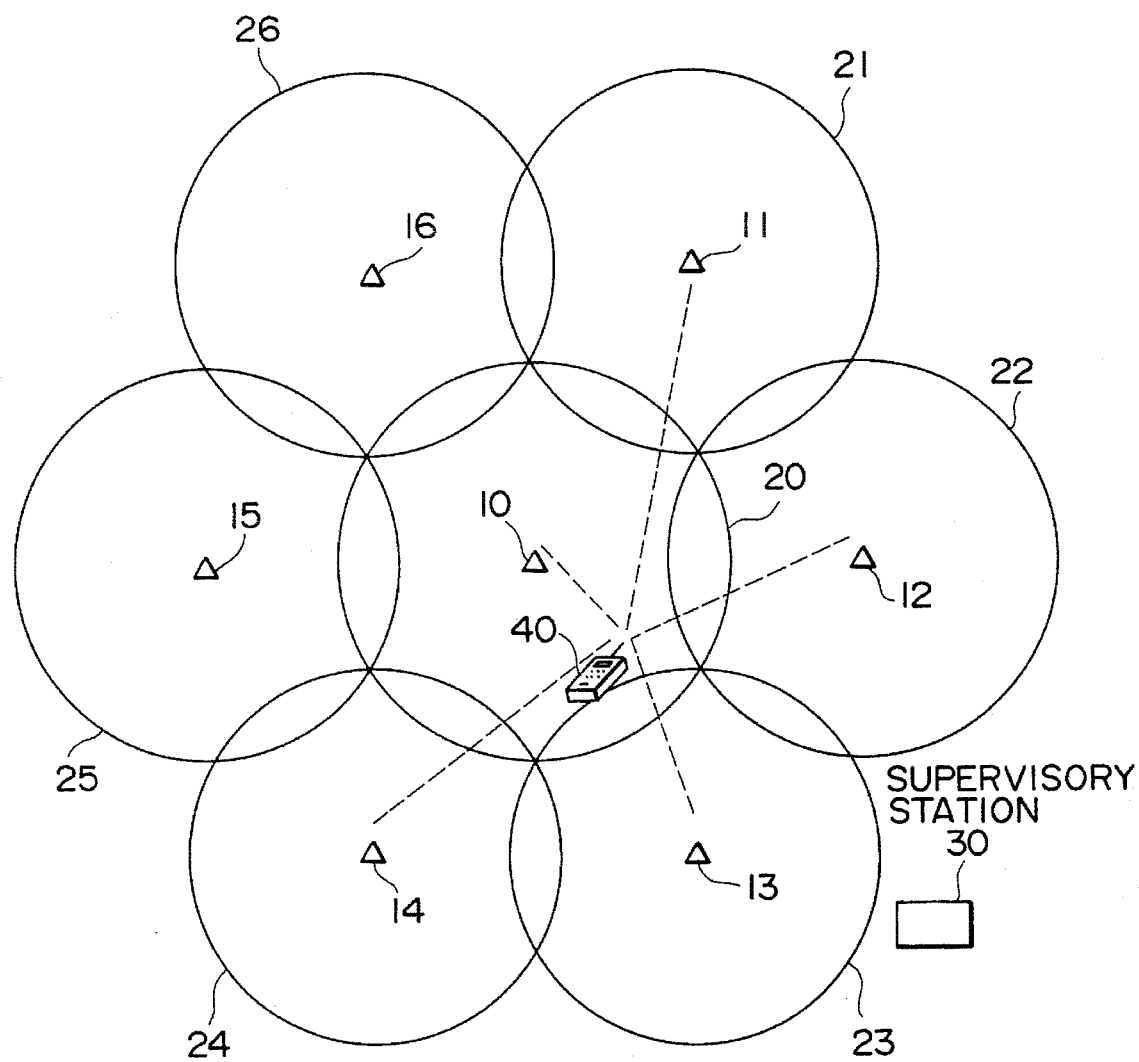
FIG. 1 shows an arrangement of a mobile communication system of the present invention.

FIG. 1 to FIG. 7 relate to a first embodiment of a mobile communication system in which a caller can notify a predetermined party that he is in an emergency and transmit the present location of the mobile station by simply hitting a single button. Referring now to FIG. 1, a plurality of fixed stations 11 to 16 are disposed so that their corresponding cells 21 to 26 may cover all areas subject to service for mobile communication. A supervisory station 30 is further disposed to manage all of the fixed stations 10 to 16. As will be described later, when a mobile station 40 transmits information regarding an emergency call, the supervisory station 40 performs a certain emergency operation after receiving further information based on the former information from a plurality of fixed station.

Figure 4:
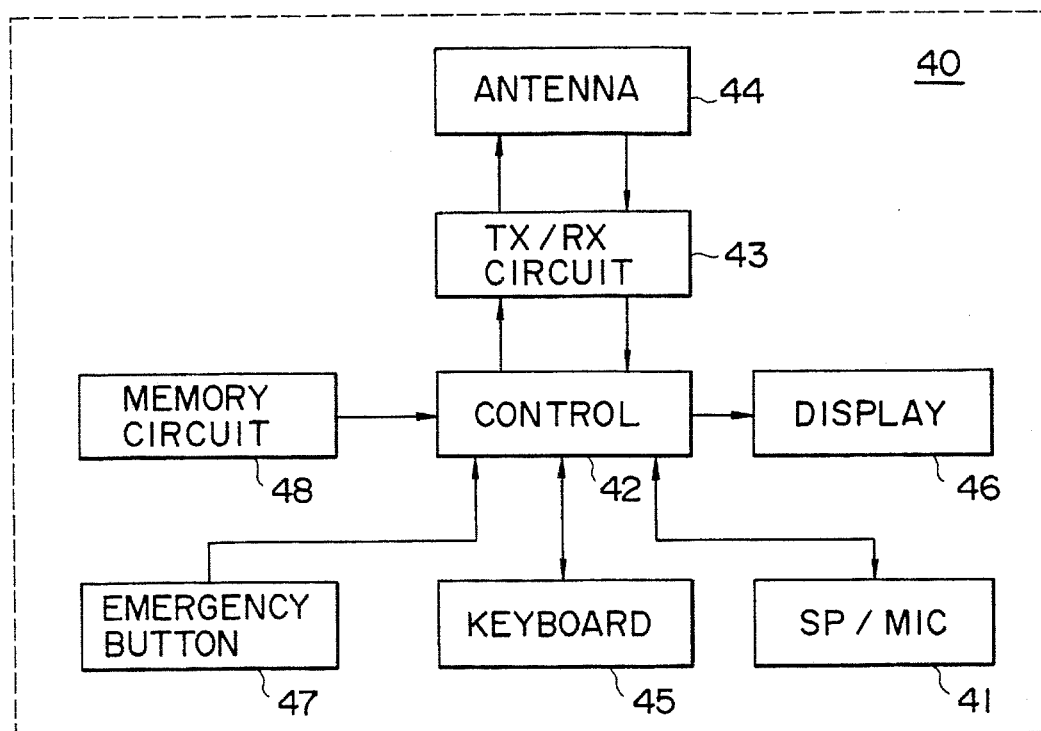
FIG. 4 is a block diagram of a mobile station of the present invention.
Figure 6:
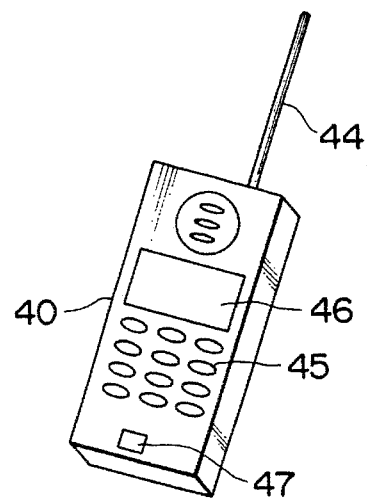
FIG. 6 shows a perspective view of the mobile station of the present invention.

FIG. 4 shows a block diagram as one embodiment of the mobile station 40. In its transmitting mode, a voice signal from a microphone 41 is provided to a transmitting circuit 43 through a control circuit 42, and then transmitting signal is sent out of an antenna 44 toward the fixed stations. In its receiving mode, on the other hand, transmitting signal from the fixed station is received by the antenna 44 and provided to a receiver circuit 43. The voice signal from another party is received by the receiver circuit 43 and can be produced by a speaker 41 through the control circuit 42. The mobile station 40 also includes a single switch or button 47 for emergency calling and a memory circuit 48. The button 47 for emergency calling may be a push switch mounted, as shown in FIG. 6, to be activated through the front panel of the mobile telephone apparatus 40. However, in front of the button 47, there is preferably a barrier (not shown) to avoid accidental operation. The memory circuit 48 stores in advance the parties to be called in an emergency.

Figure 5:
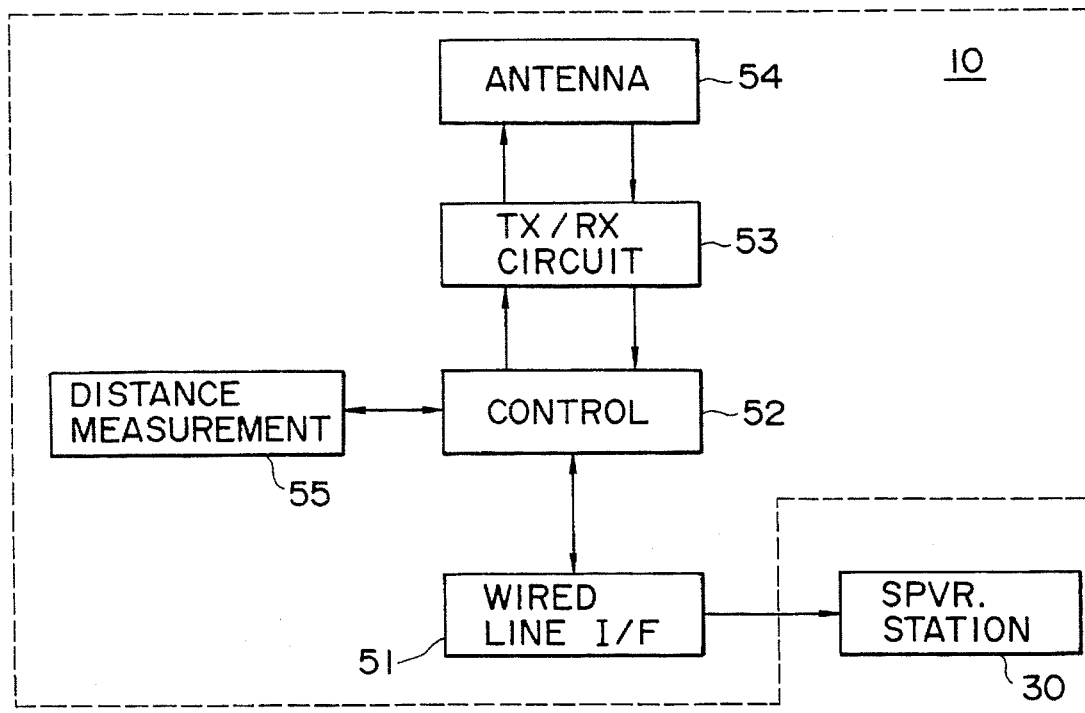
FIG. 5 is a block diagram of a fixed station of the present invention.

FIG. 5 shows a block diagram of the fixed station 10 as an example of the plural stations 10 to 16. In a normal telephone conversation mode, the transmitting signal from the mobile station 40 is received by an antenna 54. The voice signal of a caller at the mobile station 40 out of a receiver circuit 53 is provided to a wired line interface 51 through a control circuit 52 and sent out to the supervisory station 30. The voice signal from another party out of the supervisory station 30, on the other hand, is received by the wired line interface 51, and then provided to a transmitting circuit 53 through the control circuit 52. The transmitting signal from the circuit 53 is sent to the mobile station 40 through the antenna 54. The fixed station 10 also has a circuit 55 for measuring a distance between the mobile station 40 and itself when a certain signal out of the mobile station 40 is received. The method for measuring at this measurement circuit 17 will be described later in detail.

Figure 2:
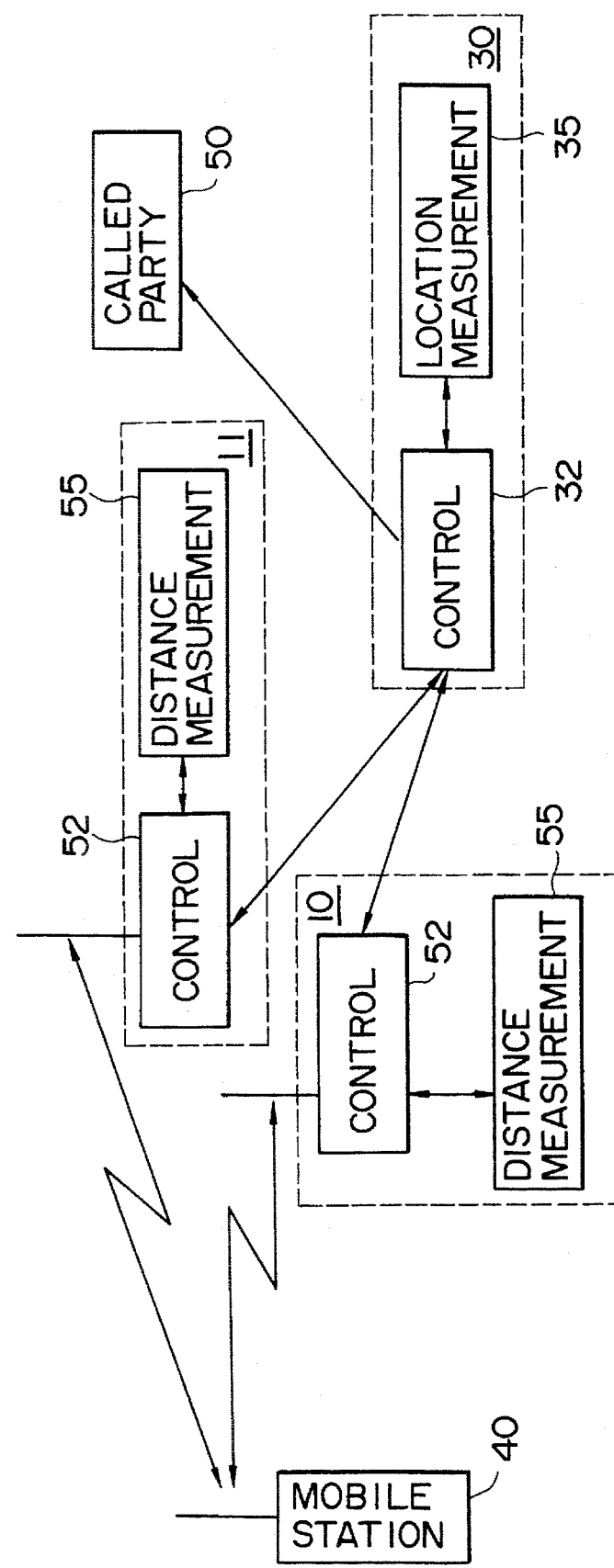
FIG. 2 is a block diagram showing a mobile communication system as one embodiment of the present invention.

As shown in FIG. 2, the supervisory circuit 30 working at an operator's office with a switchboard has a control circuit 32 and a circuit 35 for measuring the location of the caller at the mobile station 40. The location measurement circuit 35 seeks the location of the caller based on the information sent from a plurality of the fixed stations regarding the distance between each of the fixed stations and the mobile station 40. In FIG. 2, a called party 50 means a certain emergency agency to whom the caller at the mobile station 40 tries to contact and notify of the emergency condition.

Figure 3:
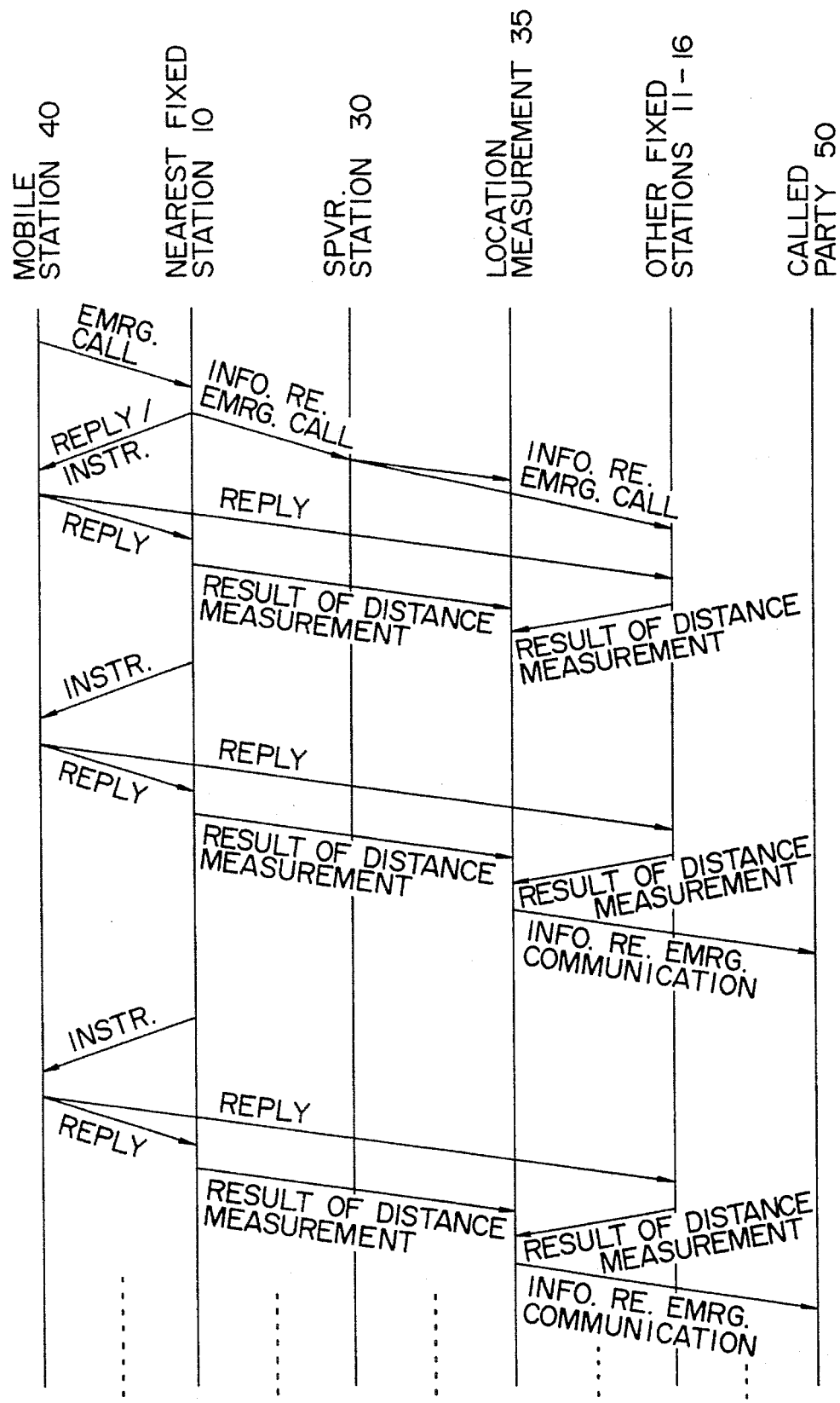
FIG. 3 is a chart showing a process of sequential operations of the system shown in FIG. 2.

Referring next to FIG. 3, the process of sequential operations when the mobile station 40 is making an emergency call is explained in detail. When the emergency calling button 47 at the mobile station 40 is activated, it is recognized by the control circuit 42. Information representing a emergency call is then sent out of the mobile station 40. This information is received by the nearest fixed station 10. In this example, the station assigned for the cell 20 where the mobile station is present receives the information. The nearest fixed station 10 recognizes the received information as related to an emergency call, and then sends a reply to the calling party and instructions back to the mobile station 40. In reply to this, the mobile station 40 responds again with information regarding a called party to be notified when in an emergency. This information is stored in the memory circuit 48. In addition, the nearest fixed station 10 measures a distance between the mobile station 40 and itself by the distance measurement circuit 55, and further notifies the peripheral fixed stations 11 to 16 of the information necessary for measuring a distance (such as the fact that an emergency call occurred, the transmitting frequency of the mobile station 40 and an ID code of the mobile station 40 and so on). In FIG. 3, this notice is implemented through the supervisory station 30. If the fixed stations 10 to 16 perform their Antenna Diversity Operation and can recognize the direction of movement of the mobile station 40, one of the fixed stations 11 to 16 can be specified to be notified.

As the result, the notified fixed station 11 to 16 enters its receive mode. It receives the information regarding the emergency call to measure a distance between the mobile station 40 and the notified fixed station 11 to 16. Then, the fixed stations 10 to 16 notify the supervisory station 30 of the respective information regarding their distance measurement. The supervisory station 30 then measures the location of the mobile station 40 by means of the location measurement circuit 35, based on the plural distance measurements and a database for a map. Once the present location of the mobile station 40 is determined, the called party specified by the information previously received is notified.

Thus, upon hitting the emergency button 47 when the mobile station 40 is in an emergency, a certain protocol is implemented for seeking the present location of the mobile station 40 and transmitting the result to the called party 50 stored in the mobile station 40. Therefore, in accordance with the present invention, emergency communication can be easily and quickly performed by hitting a single button in a mobile communication system such as an automobile telephone. Further, the present location of a caller through mobile station can be automatically transmitted to the called party 50, such as an emergency agency, in order to obtain help. Also, it is possible to inform the agency of the caller's emergency situation even if no one answers the call.

Figure 7:
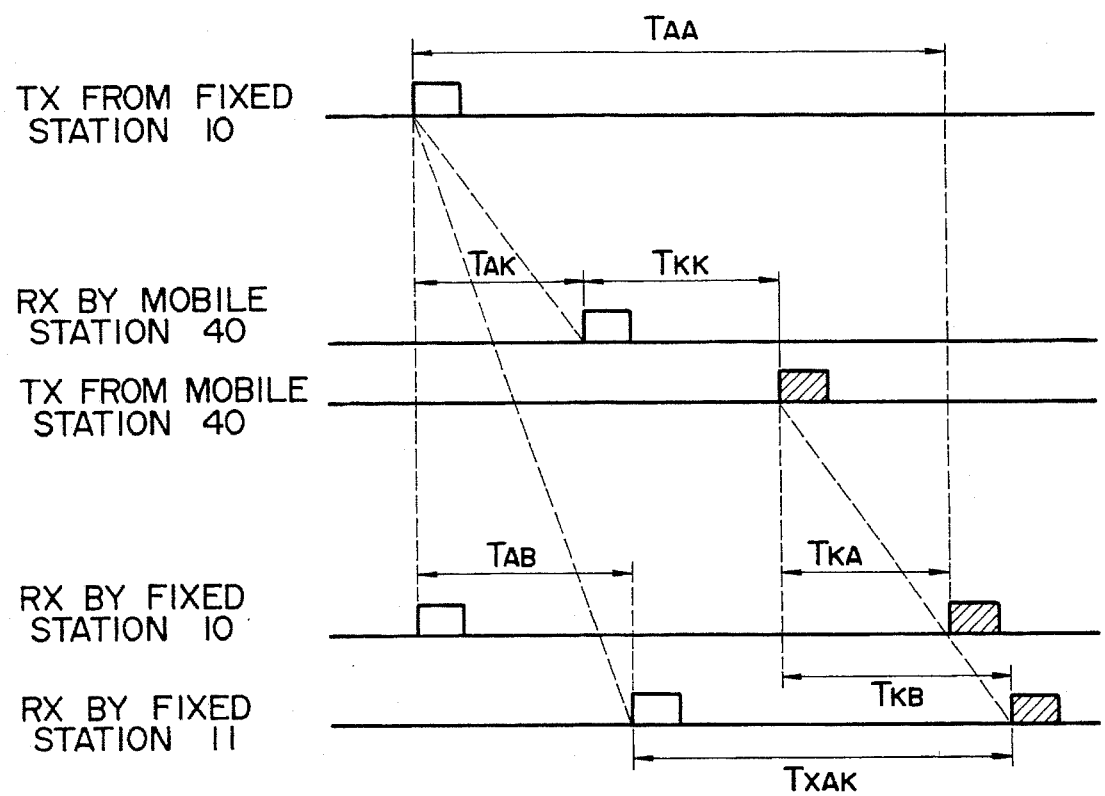
FIG. 7 shows a timing chart in connection with the method for measuring a distance to the mobile station of the present invention.

The above mentioned circuit 55 can measure a distance to the mobile station 40 using the transmission time of the radio wave from the fixed station 10 to the mobile station 40, and from the mobile station 40 back to the fixed station 10, as shown in FIG. 7. Referring now to FIG. 7, TAA means time for the fixed station 10 to receive a reply burst signal from the mobile station 40 after sending a burst signal to the mobile station 40;

TAK means time for the mobile station 40 to receive the burst signal from the fixed station 10;

TKK means time at the mobile station 40 for processing and synchronizing timing; and TKA means time for the fixed station 10 to receive a burst signal transmitted from the mobile station 40.

Therefore, $$TAA=TAK+TKK+TKA \tag{1}$$

As
TAK=TKA,
TAA=2TAK+TKK
Therefore, $$TAK=(TAA-TKK)/2 \tag{2}$$

In this form (2), since TKK is previously known (as being constant), the fixed station 10 can determine the transmission time TAK to the mobile station 40 through the formula (2).

On the other hand, TAB means time for one of the fixed stations, for example 11, to receive the burst signal after transmission by the fixed station 10; TXAK means time for the fixed station 11 to receive the reply burst signal from the mobile station 40 after receiving the burst signal from the fixed station 10; TKB means time for the fixed station 11 to receive the reply burst signal from the mobile station 40. Then, $$TAB+TXAK=TAK+TKK+TKA \tag{3}$$

And this formula (3) can be rewritten as $$TKB=TAB+TXAK-TAK-TKK \tag{4}$$

In this formula (4), since TAB and TKK are previously known (as being constant) and TAK can be informed by the fixed station 10, the fixed station 11 can determine the transmission time TKB to the mobile station 40 through the formula (4).

Once the transmission times TAK and TKB from the respective fixed stations 10 and 11 are known, the respective distance to the mobile station 40 from the fixed stations 10 and 11 can be calculated, and therefore the present location of the mobile station 40 can be determined from the calculated distance. Assuming that the transmitting speed for digital data is 270,833 kbps for transmitting and receiving between the mobile station 40 and the fixed station 10 or 11, and the transmission time can be measured within one fourth (¼) of a single bit, the time corresponding to the one fourth (¼) of a single bit, is approximately 12/13 micro second. Since the speed of the transmitted wave is $$3.8 \times 10^8 \text{ m/sec},$$

the accuracy of this calculation by measurement corresponding to one fourth (¼) of a single bit would be $$3.8 \times 10^8 \times (12/13) \times 10^{-6} = 277 \text{ m}.$$

In other words, location of the mobile station 40 can be determined within about 277 meters. If 13 MHz is used as the frequency of the system clock, the accuracy could be improved to $$3.0 \times 10^8 \times (1/13) \times 10^{-6} = 23.1 \text{ m}.$$

Therefore, the location of the mobile station 40 can be determined within about 23.1 meters. In both cases, precise correction of the location measurement can be made with mapping information to improve accuracy.

Figure 8:
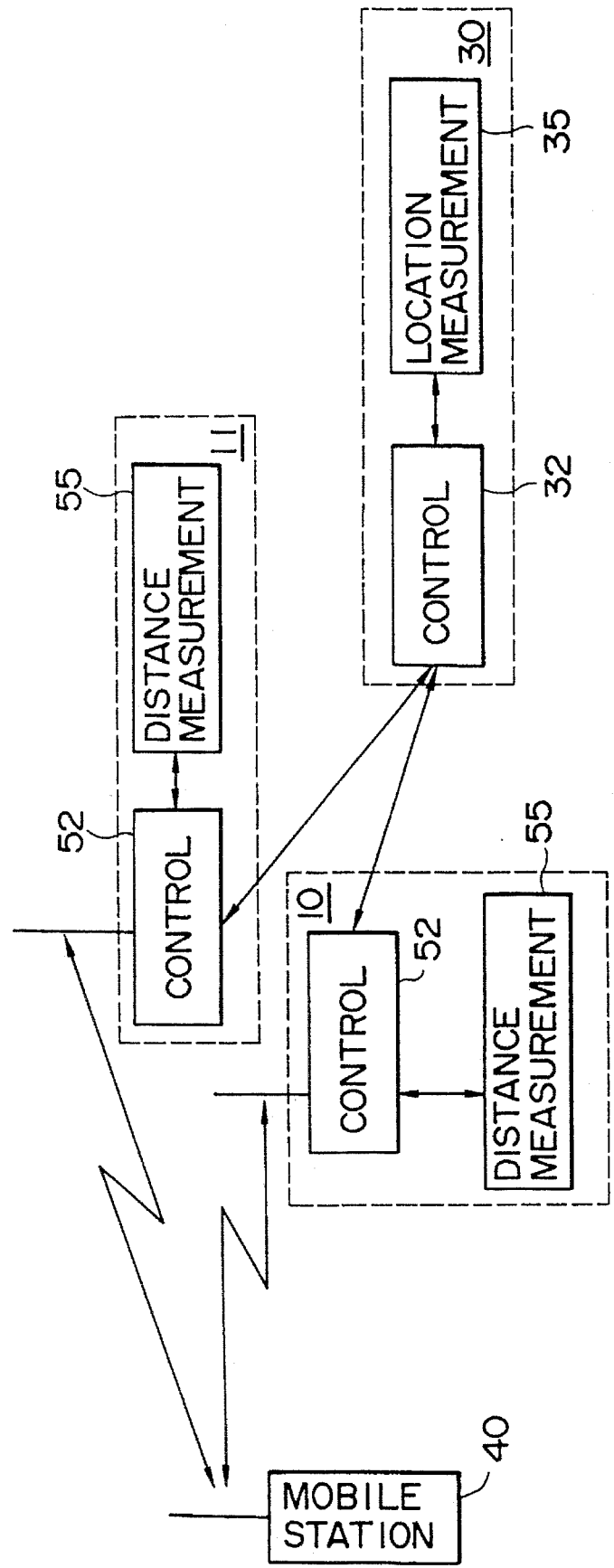
FIG. 8 is a block diagram showing mobile communication system as another embodiment of the present invention.

FIGS. 8 and 9 illustrate another embodiment of the present invention in which a caller of the mobile station 40 can determine his own present location by hitting a single button, for example, when he loses his way. In this embodiment, though the relation between the mobile station 40, the fixed stations 10 to 16 and the supervisory station 30 is the same as the first embodiment, there is no emergency calling button 47 and information regarding location measurement is stored in the memory circuit 48 of the mobile station 40.

To determine the present location of the mobile station 40, the sequential operations for examples as shown in FIG. 9 is implemented. Mobile station 40 makes a call to a party who provides the service relating to location measurement. This may be done by dialing or by hitting a certain button of the keyboard 45 during a conversation to demand the service for location measurement. The demand for location measurement is sent out of the mobile station 40 and received by the nearest fixed station 10 in charge of the cell 20 where the mobile station 40 is presently located. The nearest fixed station 10 recognizes the received information as related to the demand of location measurement. A reply to the call and some instructions are sent back to mobile station 40. In reply to this, the mobile station 40 responds again.

Thereafter, similar to the emergency calling, the fixed stations 10 to 16 measure the distance to the mobile station 40, and the supervisory station 30 seeks the present location of the mobile station 40 based on the result of the distance measurement. The result of the location measurement is sent from the supervisory station 30 to the mobile station 40 through the nearest fixed station 10. The result of the location is stored into the memory circuit 48 and then provided to the display portion 46 to display the present location of the mobile station 40.

In accordance with this embodiment of the present invention, a caller can determine the present location of the mobile station 40 by pressing a button. Therefore, this invention could be applicable to a simple navigational apparatus for the cellular phone system used with, for example, an automobile telephone. Also, a hand-off operation in the cellular phone system when the automobile goes across the boundary of cell can be simplified because the neighbor cell and its fixed station can be easily recognized. In addition, it can be easily understood that if a database is combined with the location measurement circuit 35, relating map and address information of the cell 20 where the mobile station 40 is presently located, the map and address information can be displayed at the display portion 46.

While specific embodiments of the invention have been shown and disclosed, it is to be understood that numerous changes and modifications may be made by those skilled in the art without departing from the scope and intent of the invention.

What is claimed is:

1. Mobile communication system comprising a mobile station, a plurality of fixed stations and a supervisory station for the fixed stations, comprising:

a switch attached to said mobile station;

a memory in said mobile station for storing information including information relating to a predetermined mobile station;

a transmitting circuit included in said mobile station for sending a demand signal, upon actuation of said switch, to said fixed stations to initiate predetermined operations of said fixed stations;

each of said fixed stations comprising circuitry for measuring a respective distance between said each fixed station in response to said demand signal by measuring a time required to receive a reply burst from said mobile station after transmitting a burst signal to said mobile station, said reply burst including said information relating to said predetermined mobile station, and circuitry for informing said supervisory station of a result of said respective distance measurement;

a circuit in said supervisory station for determining a present location of said mobile station in accordance with said results of said distance measurements received from said plurality of said fixed stations; and wherein said supervisory station further comprises means for notifying said predetermined mobile station at a location remote from said mobile station of said present location of said mobile station.

2. Mobile communication system comprising a mobile station, a plurality of fixed stations and a supervisory station for the fixed stations, comprising:

a switch attached to said mobile station to be operated for sending a demand signal;

a memory for storing information, including information relating to a predetermined mobile station;

each of said fixed stations comprising circuitry for measuring a respective distance between said each fixed station and said mobile station in response to said demand signal by measuring a time required to receive a reply burst from said mobile station after transmitting a burst signal to said mobile station, said reply burst including said information relating to said predetermined mobile station and circuitry for informing said supervisory station of the result of said distance measurement;

a circuit in said supervisory station for determining a present location of said mobile station in accordance with said results of said distance measurements received from said plurality of said fixed stations; and means for transmitting information regarding said present location of said mobile station to said predetermined mobile station.

3. The mobile communication system in accordance with claim 2, wherein said predetermined mobile station further includes a display portion which shows said information regarding said present location sent from said supervisory station.

4. A system for alerting a predetermined mobile station of a location of a mobile station, said system comprising:

a plurality of fixed stations;

a supervisory station;

wherein said mobile station comprises:
   a switch;
   a transmitting circuit for sending a demand signal to said plurality of fixed stations upon actuation of said switch;
   a memory for storing information, including information relating to said predetermined mobile station;

wherein each of said fixed station comprises:
   circuitry for measuring a respective distance between said mobile station and each of said fixed stations in response to said demand signal by measuring a time required to receive a reply burst from said mobile station after transmitting a burst signal to said mobile station, said reply burst including said information relating to said predetermined mobile station, and circuitry for informing said supervisory station of a result of said distance measurement in response to said demand signal;

wherein said supervisory station comprises:
   circuitry for determining a present location of said mobile station in accordance with said results of said distance measurements received from said plurality of fixed stations; and
   means for notifying said predetermined mobile station of said present location of said mobile station.

5. A mobile station comprising:

a memory for storing information, including information relating to a predetermined mobile station;

a switch;

a transmitting circuit for sending a demand signal to a plurality of fixed stations upon actuation of said switch; each of said fixed stations comprising measuring circuitry for measuring a respective distance between said mobile station and each said fixed station in response to said demand signal by measuring a time required to receive a reply burst from said mobile station after transmitting a burst signal to said mobile station, said reply burst including said information relating to said predetermined mobile station, and circuitry for transmitting said measured distance measurement to a supervisory station;

said supervisory station comprises:
   circuitry for determining a present location of said mobile station in accordance with said distance measurements transmitted from said plurality of fixed stations; and
   means for notifying said predetermined mobile station of said present location of said mobile station.

6. A system for alerting a predetermined mobile station of location of a mobile station, said system comprising:

a plurality of fixed stations;

a supervisory station;

wherein said mobile station comprises:
   a switch;
   a transmitting circuit for sending a demand signal to said plurality of fixed stations upon actuation of said switch;
   a memory for storing information, including information relating to said predetermined mobile station;

wherein each of said fixed stations comprises:
   circuitry for measuring a respective distance between said mobile station and said each fixed station in response to said demand signal by measuring a time required to receive a reply burst from said mobile station after transmitting a burst signal to said mobile station, said reply burst including said information relating to said predetermined mobile station; and
   circuitry for transmitting said distance measurement to said supervisory station in response to said demand signal;

wherein said supervisory station comprises:
   circuitry for determining a present location of said mobile station in accordance with said distance measurements transmitted from said plurality of fixed stations; and
   means for notifying said predetermined mobile station of said present location of said mobile station.

7. A method of alerting a predetermined mobile station of a location of a mobile station in a mobile communication system, said mobile station having a control circuit and a memory circuit, said memory circuit including information relating to said predetermined mobile station, said system including a plurality of fixed stations, and a supervisory station having a database storing geographical information, said method comprising the steps of:

transmitting a demand signal from said mobile station;

receiving said demand signal in each of said plurality of fixed stations including one fixed station which is nearest to said mobile station;

transmitting a first reply burst including emergency instructions from said nearest fixed station to said mobile station and to said other fixed stations;

transmitting a second reply burst from said mobile station in response to said first reply burst, said second reply burst including said information relating to said predetermined mobile station;

measuring a distance between said mobile station and each of said plurality of fixed stations by measuring a time required for each fixed station to receive said second reply burst in response to said first reply burst from said mobile station;

notifying each of said plurality of fixed stations through said supervisory station of transmitting frequency information and identification code information stored in said memory circuit of said mobile station;

notifying said supervisory station of distance information comprising said measured distance between said mobile station and each of said plurality of fixed stations;

determining said location of said mobile station in said supervisory station from said distance information and said geographical information of said supervisory station database; and providing said location to said predetermined mobile station.

8. A method of alerting a predetermined mobile station of a location of a mobile station in a mobile communication system, said mobile station having a control circuit and a memory circuit, said memory circuit including information relating to said predetermined mobile station, said system including a plurality of fixed stations, and a supervisory station for said fixed stations, said supervisory station having a database comprising geographical information, said method comprising the steps of:

activating a switch disposed in said mobile station;

recognizing said activated switch in said mobile station control circuit;

transmitting a first emergency call information from said mobile station;

receiving said first emergency call information in one of said plurality of fixed stations which is nearest to said mobile station;

recognizing said first emergency call information in said nearest fixed station;

transmitting a first reply burst including emergency instructions from said nearest fixed station to said mobile station;

transmitting a second reply burst including said information relating to said predetermined mobile station from said mobile station in response to said first reply burst, said second reply burst comprising second emergency call information;

storing said second emergency call information in said memory circuit;

measuring a distance between said mobile station and said nearest fixed station in said nearest fixed station by measuring a time required to receive said second reply burst in response to said first reply burst;

notifying each of said plurality of fixed stations through said supervisory station of transmitting frequency information and identification code information stored in said memory circuit of said mobile station;

placing each of said plurality of fixed stations in a condition to receive said second emergency call information;

measuring a distance between said mobile station and each of said plurality of fixed stations other than said nearest fixed station to provide third emergency call information;

notifying said supervisory station of said third emergency call information;

determining said location of said mobile station in said supervisory station from said third emergency call information and said geographical information of said supervisory station database; and, notifying said predetermined mobile station of said determined location.

* * * * *